US006320586B1

United States Patent
Plattner et al.

(10) Patent No.: US 6,320,586 B1
(45) Date of Patent: Nov. 20, 2001

(54) SYSTEM AN METHOD FOR THE VISUAL DISPLAY OF DATA IN AN INTERACTIVE SPLIT PIE CHART

(75) Inventors: Hasso Plattner, Altenbach (DE); Keith Elliott, Palo Alto, CA (US); Michael Good, Los Altos, CA (US); John M. Wilson, III, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 09/186,672

(22) Filed: Nov. 4, 1998

(51) Int. Cl.$^7$ .................................................. G06T 11/20
(52) U.S. Cl. ............................................ 345/441; 345/440
(58) Field of Search ...................................... 345/440, 441

(56) References Cited

U.S. PATENT DOCUMENTS

| | | | |
|---|---|---|---|
| 5,491,779 | * 2/1996 | Bezjian | 345/440 |
| 5,513,271 | * 4/1996 | Rao et al. | 382/113 |
| 5,734,888 | * 3/1998 | Li et al. | 395/604 |
| 5,844,572 | * 12/1998 | Schott | 345/440 |

OTHER PUBLICATIONS

Diercke Weltatlas (World Atlas), 4th ed. 1996, Braunschweig, Germany (One relevant page enclosed).

Croxton, Frederick E. and Roy E. Stryker, "Bar Charts Versus Circle Diagrams," *Journal of the American Statistical Association*, No. 160, 1927, pp. 473–482.

Hollands, J.G. and Ian Spence, "Integral And Separable Dimensions In Graph Reading," Proceedings of the Human Factors and Ergonomics Society 41st Annual Meeting–1997, Santa Monica, California, 1997, pp. 1352–1356.

Hollands, J.G. and Brian P. Dyre, "Bias in Proportion Judgments With Pie Charts: The Cyclical Power Model," Proceedings of the Human Factors and Ergonomics Society 41st Annual Meeting–1997, Santa Monica, California, 1997, pp. 1357–1361.

* cited by examiner

*Primary Examiner*—Jeffery Brier
*Assistant Examiner*—Motilewa Good-Johnson
(74) *Attorney, Agent, or Firm*—Finnegan, Henderson, Farabow, Garrett and Dunner L.L.P.

(57) ABSTRACT

A computer system having a visual display which displays data in an interactive split pie chart and permits a user to modify the input parameters of the pie chart to dynamically alter the configuration of the chart. The split pie chart can be split into two or more sections each corresponding to a different time period. Each section is divided into wedges corresponding to different variables and their corresponding values in two different time periods. Finally, the chart itself is geographically placed on a graphic image of a map. An interface between the computer system and a data storage system to transfer data to be transformed into the graphical representation of the pie chart is provided. The user modifies the input parameters of the pie chart through a user interface which translates the modifications into queries to the database storage system to retrieve the appropriate data.

82 Claims, 17 Drawing Sheets

| PRODUCT LINE | FISCAL YEAR | GROSS SALES |
|---|---|---|
| CELLULAR PHONES | 1997<br>1998 | $ 5,250,800<br>$ 4,882,600 |
| HOME AUDIO/VIDEO | 1997<br>1998 | $ 6,250,800<br>$ 6,850,800 |
| COMPUTER HARDWARE | 1997<br>1998 | $ 876,500<br>$ 8,843,700 |
| COMPUTER SOFTWARE | 1997<br>1998 | $ 182,500<br>$ 1,250,860 |
| OTHER | 1997<br>1998 | $ 58,000<br>$ 235,177 |
| TOTAL | 1997<br>1998 | $ 12,618,600<br>$ 20,063,137 |

FIG. 6

| PRODUCT LINE | FISCAL YEAR | GROSS SALES |
|---|---|---|
| CELLULAR PHONES | 1997<br>1998<br>1999 | $ 5,250,800<br>$ 4,882,600<br>$ 3,522,200 |
| HOME AUDIO/VIDEO | 1997<br>1998<br>1999 | $ 6, 250,800<br>$ 6,850,800<br>$ 6,934,560 |
| COMPUTER HARDWARE | 1997<br>1998<br>1999 | $ 876,500<br>$ 6,843,700<br>$ 7,143,762 |
| COMPUTER SOFTWARE | 1997<br>1998<br>1999 | $ 182,500<br>$ 1,250,860<br>$ 1,459,487 |
| OTHER | 1997<br>1998<br>1999 | $ 58,000<br>$ 235,177<br>$ 652,384 |
| TOTAL | 1997<br>1998<br>1999 | $ 12,618,600<br>$ 20,063,137<br>$ 19,712,393 |

FIG. 9

Example 2: SplitPie chart with 3 splits

TicksFollowSplits = False

TicksFollowSplits = True

SYSTEM AN METHOD FOR THE VISUAL DISPLAY OF DATA IN AN INTERACTIVE SPLIT PIE CHART

BRIEF DESCRIPTION OF THE DRAWINGS

FIG. 6 is a sample table of data to which the present invention could be applied.

FIG. 9 is a sample table with three sets of sales figures.

BACKGROUND OF THE INVENTION

Figure 1:
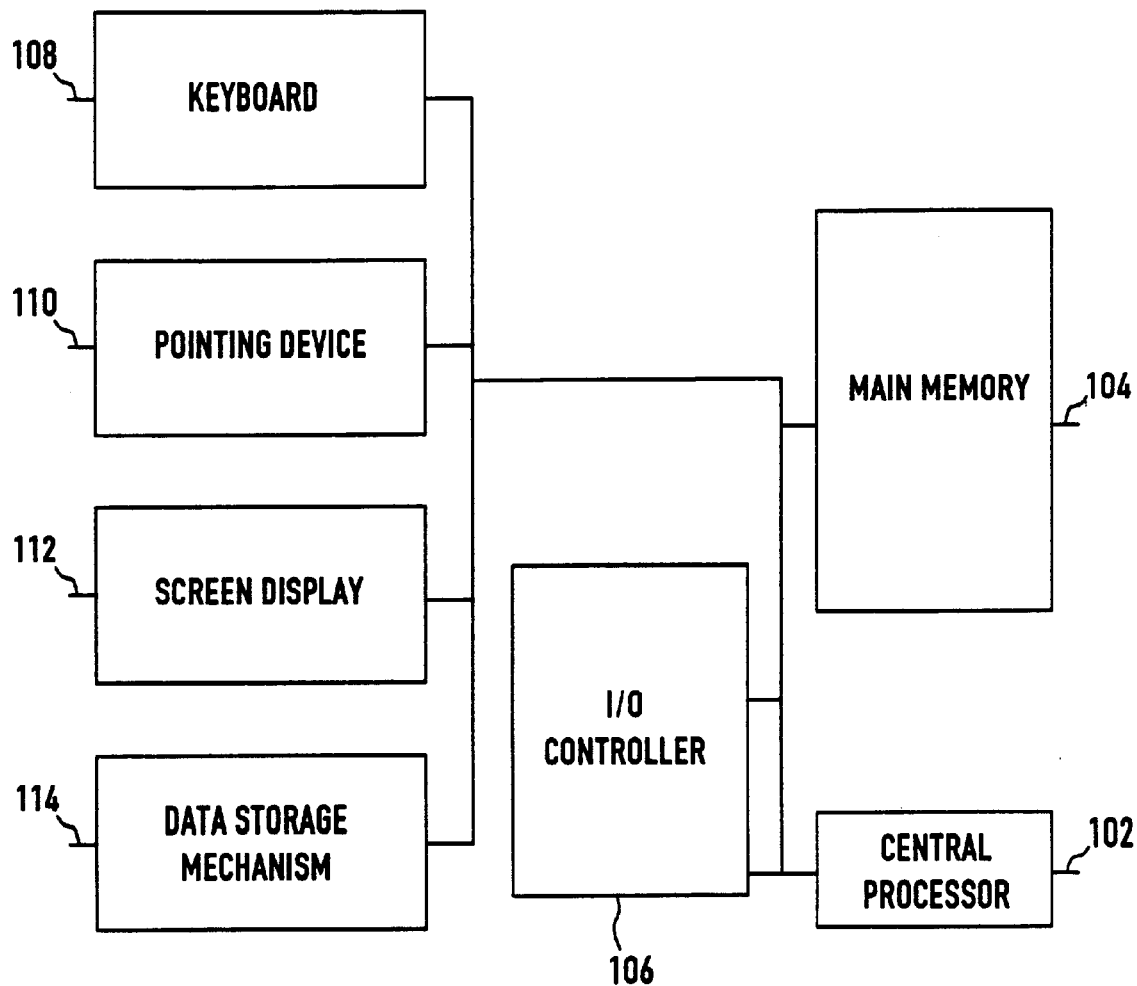
FIG. 1 depicts a computer system in which the present invention can be implemented.

In the computer processing field, it is common to store data in a commercial database system and to retrieve such data using a computer system. It is also common to display such information in a variety of ways, each of which is suited for displaying a particular type or quantity of data. Many options are available for presenting data, especially with the advent of word processors, spreadsheets, and graphics software programs for creating tables and graphs.

In order to communicate information decisions effectively to users, designers need to understand the tasks in which readers engage when they look at displays. Because the user's tasks require certain sensory, perceptual and cognitive operations, one has to consider what type of information the user is trying to ascertain in reading the graph. For example, a well-designed line graph makes it easier to discern the slopes of lines, whereas, if the user's goal is to determine actual values at certain points, differentiating slopes is of little value.

There are various factors in making a decision about how to present data. The first factor concerns the amount of data being presented. When presenting a small amount of data, authors should weigh the communicative benefits of tabular or graphical presentation against the reader's cognitive costs. Generally, in this case, tabular presentation is preferred. However, with a large amount of data, the reader's use of the data, especially the degree of precision the reader is likely to need, becomes important. If relations are more important than precise values, then the data would probably be best displayed in a graph. Furthermore, readers with a general interest in a topic but no specific interest, may examine a graph to get the main idea. In contrast, readers who have done extensive work on a topic may examine the data in detail.

Finally, one must then choose the type of graph to present the information. This decision depends on both the characteristics of on the readers and of independent and dependent variables. Generally, common graphs with which all readers are likely to have experience are used: line graphs, bar graphs, pie charts, and scatter plots. The choice of graph type depends on the readers' informational needs. Either a line graph or a bar graph is used if readers need to determine relative or absolute amounts. A line graph is used if readers need to determine the rate of increase of the dependent (criterion) variable as a function of changes in the independent (predictor) variable. A bar graph is used if readers need to determine the difference between the means of the dependent variable across different levels of the independent variable. A pie chart is used if readers need to determine proportions but not absolute amounts.

Another important factor in the design of visual displays is the general relation between physical amount and perceived amount as a power function: perceived amount=a (physical amount)$^b$, known as Stevens' law. When the exponent b=1.0, the increase in perceived amount corresponds to the increase in the physical amount; when b<1.0, the perceived amount increases more rapidly than the physical amount. Because the physical dimensions that display simple linear data extending in either vertical height or horizontal length produce Stevens' law exponents of 1.0, a reader's perception of the bar graphs and line graphs will accurately correspond to the physical distances shown in the graph. In contrast, the physical dimensions of the area of a rectangle or a circle and the volume of a cube typically produce exponents in Stevens' law of less than 1.0, resulting in an incorrect estimation of the size of indicators. Use of the lightness of shades of gray typically produces an exponent in Stevens' law of greater than 1.0.

As per the foregoing, it has always been a goal of the prior art to improve methods of displaying data in a graphically appealing format in order to allow a user to easily ascertain information by viewing the visual display. There is a need in the prior art for a method of displaying data such that relative amounts of data can be clearly visualized with an element of comparison included.

It is an object of the present invention to transmit as much information to the user in an organized manner such that the ease with which the user can view and understand the information is maximized.

It is an object of the present invention to display data such that a user can not only ascertain relative amounts within a set of data but also the relativity between multiple sets of data.

It is a further object of the present invention to provide a means to compare two sets of data corresponding to the same real world parameters with one variable change, such as time period.

It is a further object of the present invention to place this comparative graphic display on a graphic image of a map to add the further variable of geographic location.

SUMMARY OF THE INVENTION

The present invention provides a system and method for the visual display of data in an interactive split pie chart. The pie chart can display multiple sets of dependent variables in relation to at least two other variables, such as time and place. In a preferred embodiment, the split pie chart is split into two sections each corresponding to a different time period, however, any number of sections can be used as is graphically feasible. Each section is divided into wedges corresponding to different variables and their values in the two different time periods. The sizes of the sections are adjusted to demonstrate the relative sizes of the sum total of the two sets of data. Finally, the chart itself is geographically placed on a graphic image of a map. The computer system of the present invention interfaces with a data storage mechanism where the values for the different variables are stored. The user customizes the variables of the pie chart by inputting specific requests into a user interface. The user interface then in turn submits a query to the data storage mechanism for data retrieval. The data storage mechanism returns the values to be used as inputs for the visual display system for the creation of the interactive split pie chart.

DETAILED DESCRIPTION OF THE INVENTION

The following description will focus on preferred embodiment of the invention which is operative in a single computer system with an attached data storage mechanism. The present invention, however, is not limited to any particular application or environment. Instead, those skilled in the art will find that the present invention may be advantageously applied to any application or environment where the visual comparison of multiple sets of data with one variable change is desirable. The description of the exemplary embodiment which follows is for the purpose of illustration and not limitation.

Figure 2:
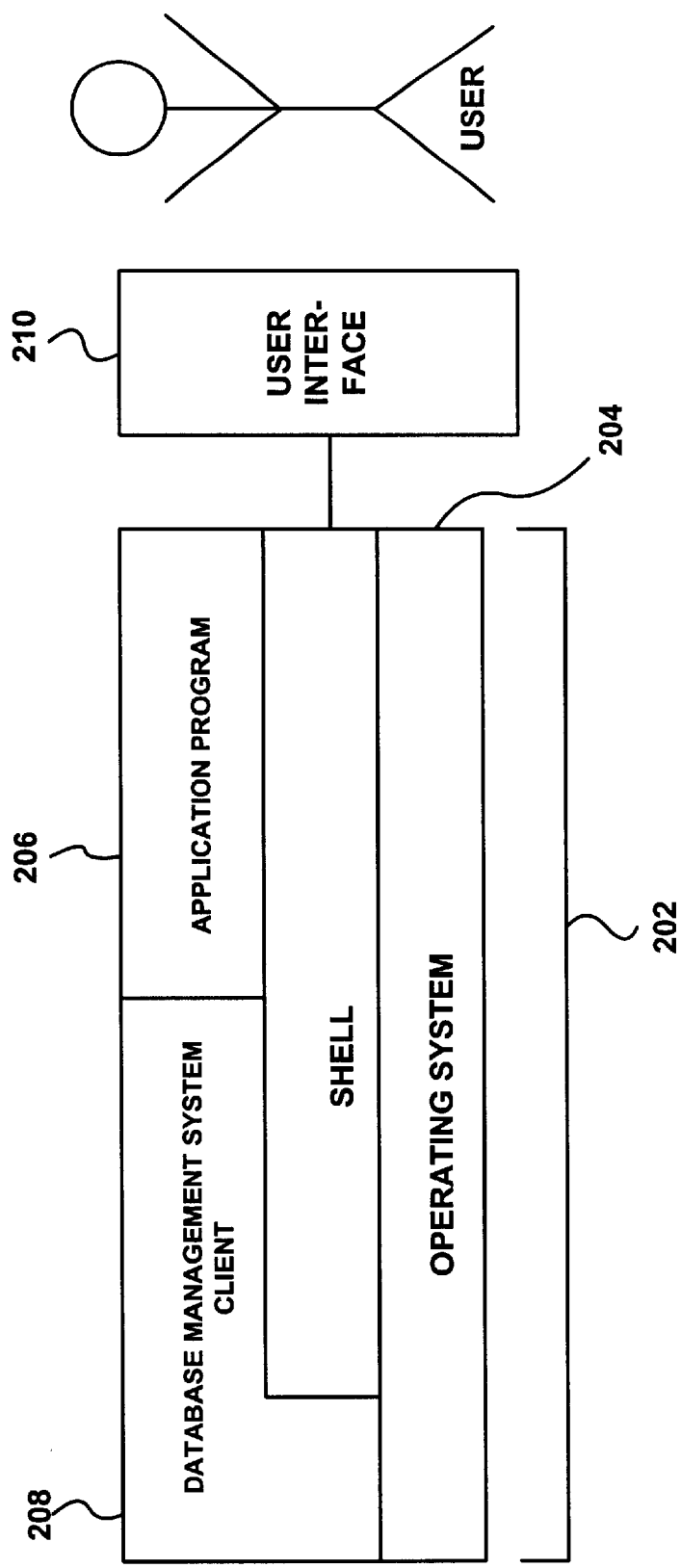
FIG. 2 is a block diagram illustrating a software subsystem for controlling the operation of the computer system of FIG. 1.

The invention may be embodied on a computer system such as the system of FIG. 1, which comprises central processor 102, main memory 104, input/output controller 106, keyboard 108, pointing device 110, screen display 112, and data storage mechanism 114. The data storage mechanism may be any one of a number of database systems such as Microsoft Access, dbase, Oracle, Sybase, etc. The data storage may be a spreadsheet, a relational database, or a multidimensional database. Illustrated in FIG. 2, a computer software system is provided for directing the operation of the computer system. The software system, which is stored in system memory 202, and on mass storage or disk memory, includes a kernel or operating system 204, which in this specific embodiment is Windows 95. One or more application programs 206, such as the application software for the present invention, may be loaded (transferred from disk into main memory) for execution by the system. There is a database management system client 208 running in system memory 202. The system also includes user interface 210 for receiving user commands and data as input and displaying result data as output.

The present invention discloses a means of visual display for a computer system which permits the user to view graphical data in an interactive split pie chart. The display of information on the visual displays can be changed by the user by selecting the appropriate icons in the user interface. While the user may select the view style by keyboard input, in the practice of this invention, the use of a mouse pointer device is preferred. The control and display of a mouse-controlled pointer device, as well as one of more user selectable push buttons, are known as graphic displays, and one skilled in the art can readily generate such graphic displays. In the practice of the present invention, the user may change the data which is displayed in the interactive split pie chart by clicking-and-dragging the mouse pointer device over the appropriate button generated and displayed in the user interface. When the user selects the desired button, the interactive split pie chart is changed to reflect the new data.

Figure 3:
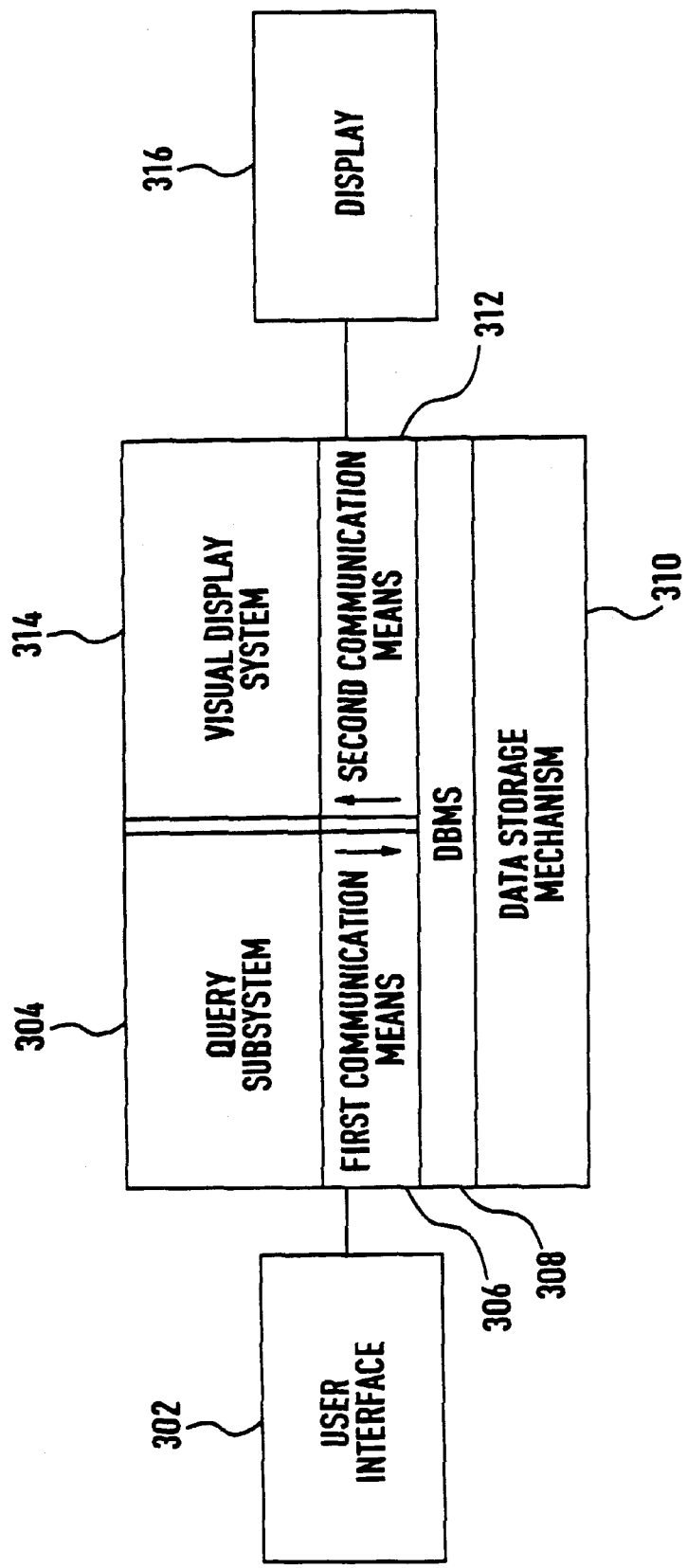
FIG. 3 depicts a block a diagram of the present invention.

The system of the present invention is depicted in FIG. 3. It comprises a user interface 302, a subsystem for formulating data queries 304, a first communication means 306 for transmitting the data queries to a database management system 308, a database storage mechanism 310, and second communication means 312 for transmitting data from the database storage mechanism to a visual display system 314 and a display 316.

Figure 4:
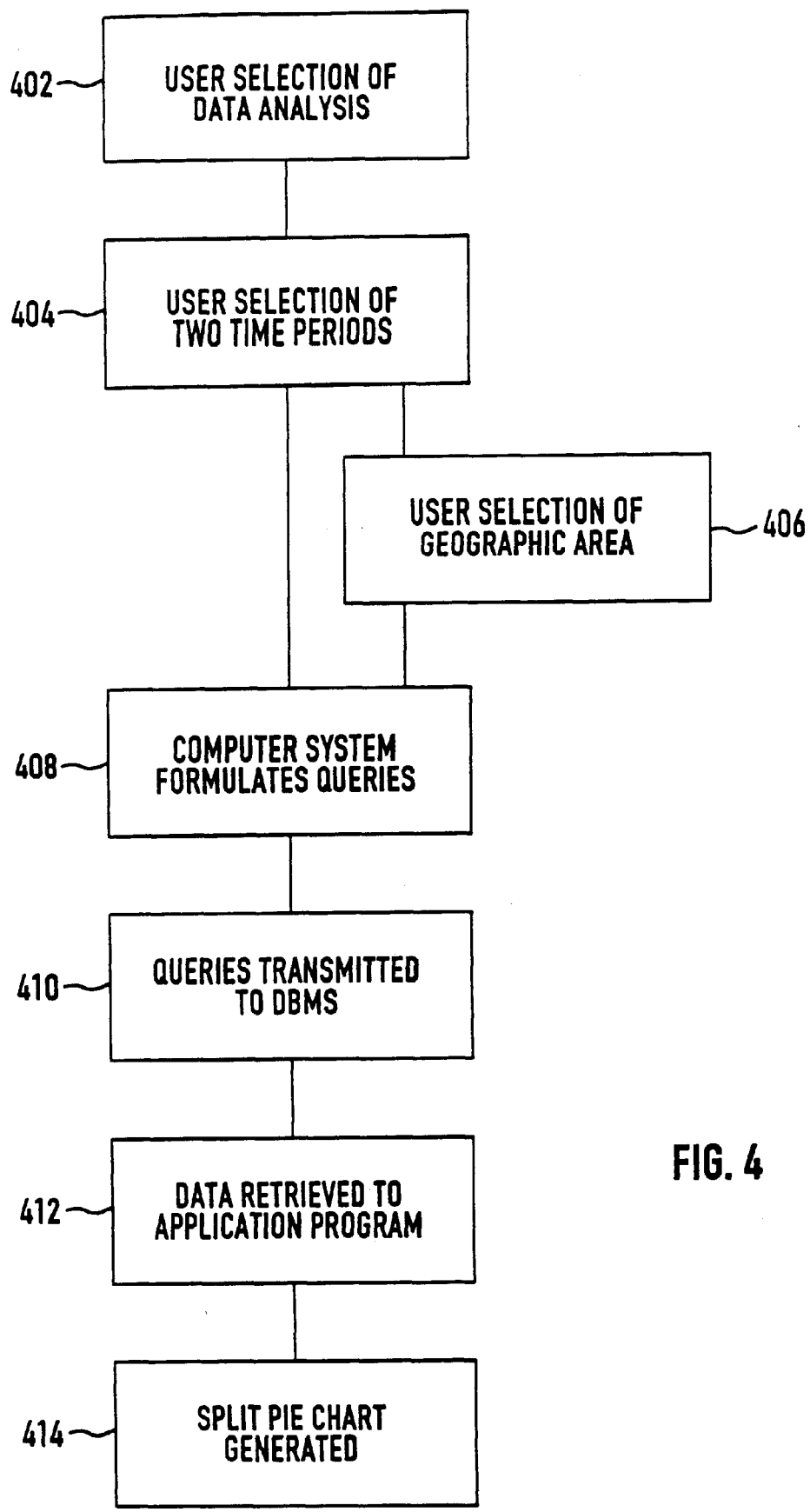
FIG. 4 depicts a flowchart showing the operation of the present invention.

FIG. 4 is a flowchart detailing the operation of the present invention. First, selection 402 of the type of data to be compared takes place, for example, sales for a particular product line. Then, selection 404 of the time periods for which the data will be compared takes place. In the present example, two time periods are used for exemplary purposes. The user can also further make a selection 406 of a particular geographic area for which the comparison is needed. Upon the making of these selections, the computer system formulates 408 queries based on the choices made by the user. In one embodiment, the system generates SQL statements to query a data storage mechanism in which the data is stored. These queries are transmitted 410 to the database management system for retrieval of the data from the data storage mechanism. The data is returned 412 to the visual display system for generation 414 of the split pie chart. The data storage mechanism is preferably either a spreadsheet, a relational database, or a multidimensional database.

Figure 5:
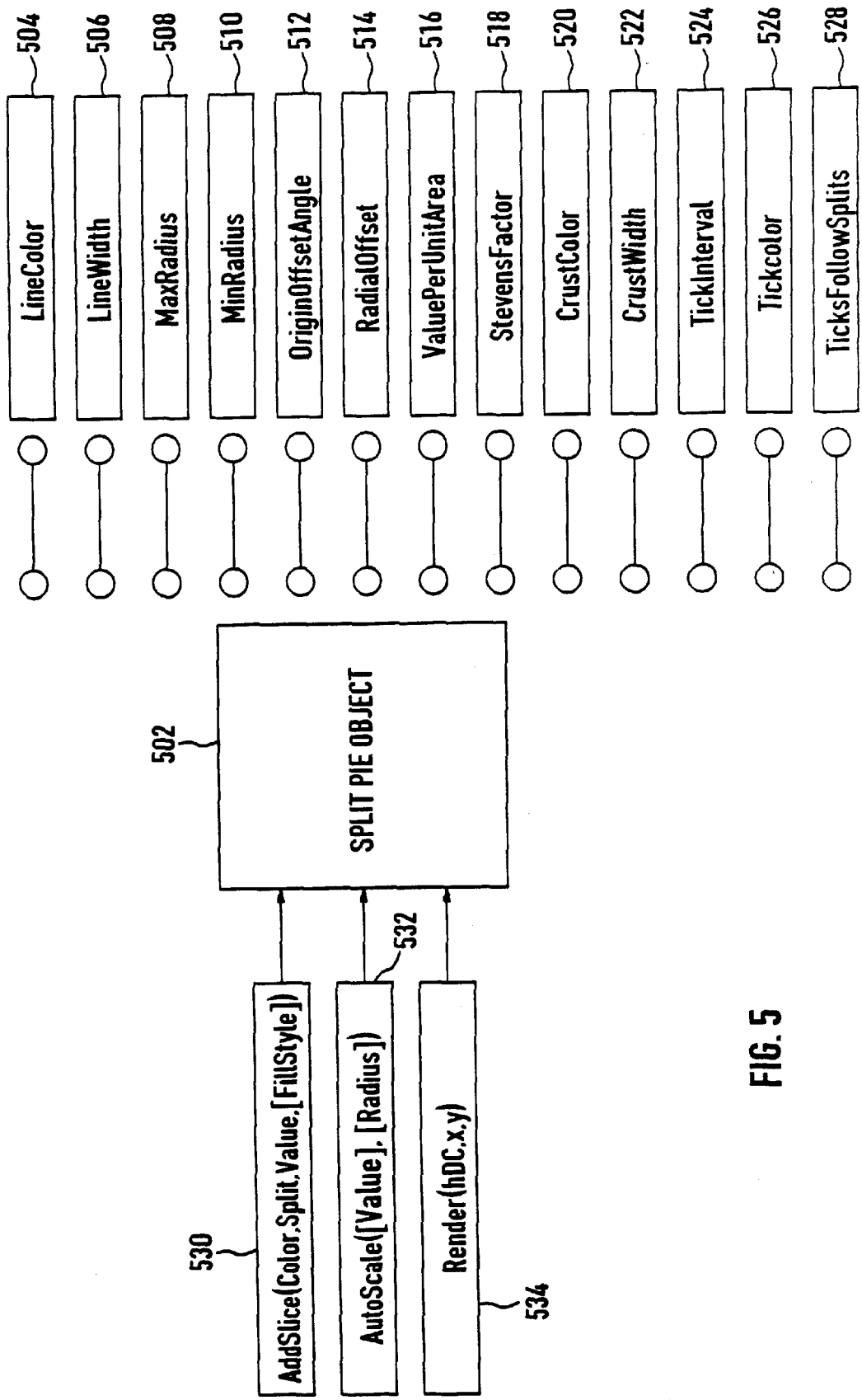
FIG. 5 illustrates the components of the split pie object with its variables and methods.

FIG. 5 illustrates the components of the split pie object 502 used to generate the split pie chart in the preferred embodiment. The LineColor variable 504 specifies the color of chart lines. The LineWidth variable 506 specifies the width of chart lines in pixels. The MaxRadius variable 508 specifies the maximum radius of the chart in pixels. A value of zero indicates that the radius of the chart is unconstrained. The MinRadius variable 510 specifies the minimum radius of the chart in pixels. The OriginOffsetAngle variable 512 specifies the angle from which to begin drawing the chart, in degrees. The RadialOffset variable 514 specifies the angle from which to begin drawing the chart, in radians. The ValuePerUnitArea variable 516 specifies the numerical value represented by a single pixel. The StevensFactor variable 518 specifies the factor by which to scale the values in order to account for the perceptual effect known as Stevens' law. The CrustColor variable 520 specifies the color to use for the outline of the entire split when drawing. The CrustWidth variable 522 specifies the width in pixels of the lines used to draw the outline of the entire split. The TickInterval variable 524 specifies the number of tick marks that should be drawn for each split, and can range from 0 to 12. The TickColor variable 526 specifies the color to use for drawing tick marks. The TicksFollowSplits variable 528 is a true/false value that determines how tick marks are drawn. The AddSlice method 530 adds a data point to the chart. The AutoScale method 532 calculates a value for the ValuePerUnitArea property. The Render method 534 draws the chart.

Figure 7:
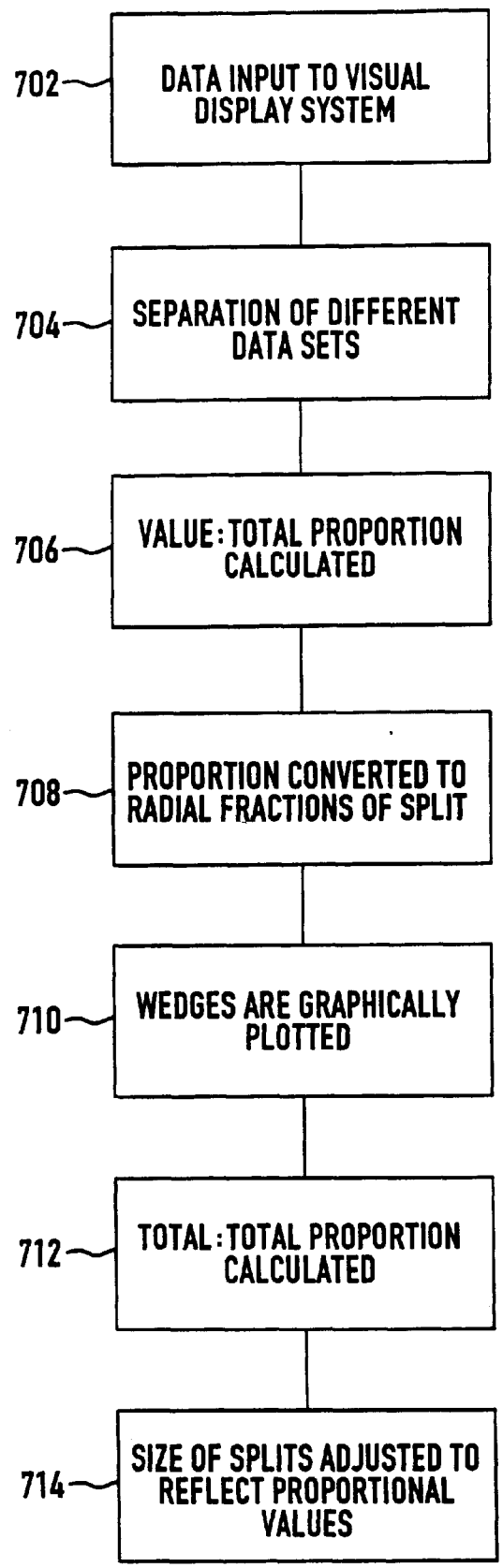
FIG. 7 is a flowchart depicting the generation of the split pie chart.
Figure 8:
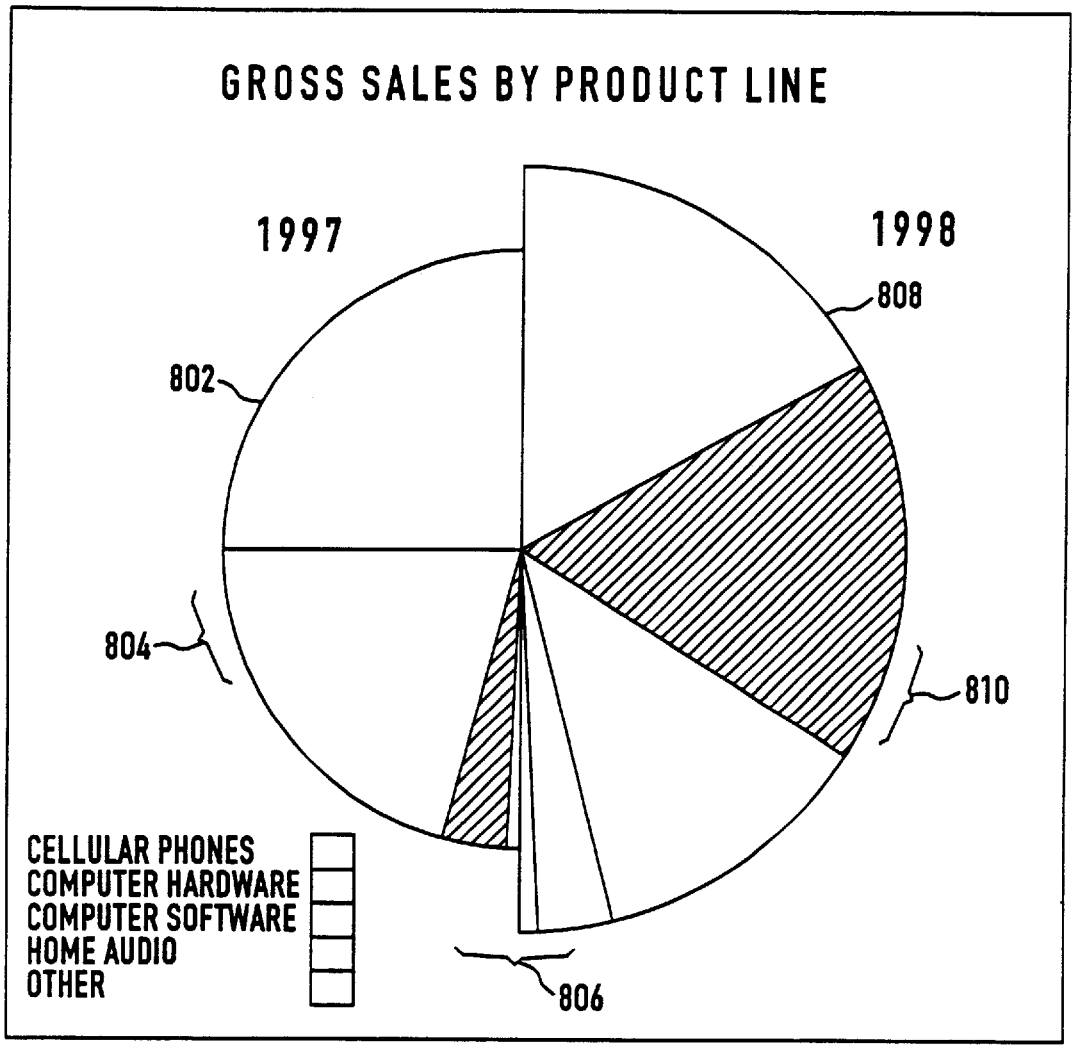
FIG. 8 is an illustration of a split pie chart of the present invention.

By way of example, FIG. 6 shows a sample table of data which is returned to the visual display system to which the present invention could be applied. In column 602, there is a list of product lines: cellular phones 604, home audio/video 606, computer hardware 608, computer software 610, other 612, and the total 614. In the second column 616, are listed the two fiscal years for which the present example applies: 1997 and 1998. In the third column 618, in cell 620 row 1, the value denotes the value of cellular phone sales in 1997 and in cell 620, row 2, the value denotes the value of cellular phone sales in 1998. FIG. 7 is a flowchart depicting the generation of the pie chart. First, the data is input 702 into the visual display system. The visual display system then separates 704 the different data sets, in this case, the data sets corresponding to the two years. Then, the proportion of each value to the total is calculated 706. These proportions are converted 708 to fractions of each split, and the wedges are graphically plotted 710. The visual display system then calculates 712 the relative value of two totals from the two different time periods as a fraction of each other. Finally, the sizes of the two splits are adjusted 714 to reflect this fraction. The present invention calculates the percentage of total sales accounted for by cellular phone sales in 1997 and creates a proportionately sized wedge 802 on the left half 804 of the split pie chart 806 depicted in FIG. 8. The present invention performs this calculation for each of the product lines for 1997 in order to create the full left split 804 of split pie chart 806. Then, the present invention calculates the percentage of total sales accounted for by cellular phone sales for 1998 and creates a proportionately sized wedge 808 on the right half 810 of split pie chart 806. Likewise, the present invention performs this calculation for each of the product lines for 1998 in order to create the full right split 810 of split pie chart 806. Finally, the present invention calculates the relative size of the total sales from 1998 in comparison to 1997 and increases or decreases the size of the appropriate half in order to reflect that relationship to achieve the goal of the invention, which is to provide a split pie chart for comparison purposes.

Figure 10:
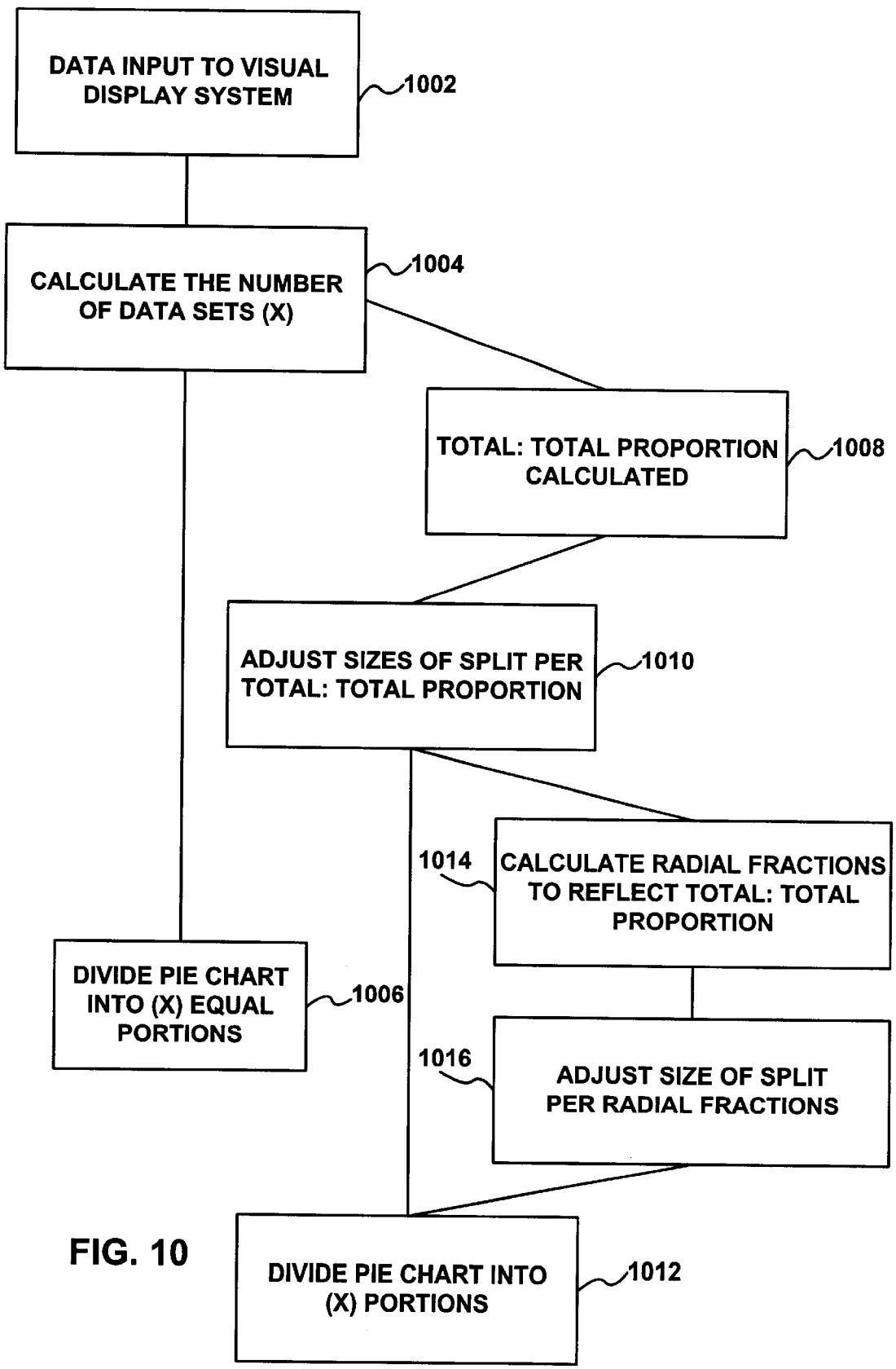
FIG. 10 is a flowchart depicting the additional calculation which occurs when constructing a split pie chart with more than two sets of data points.
Figure 11:
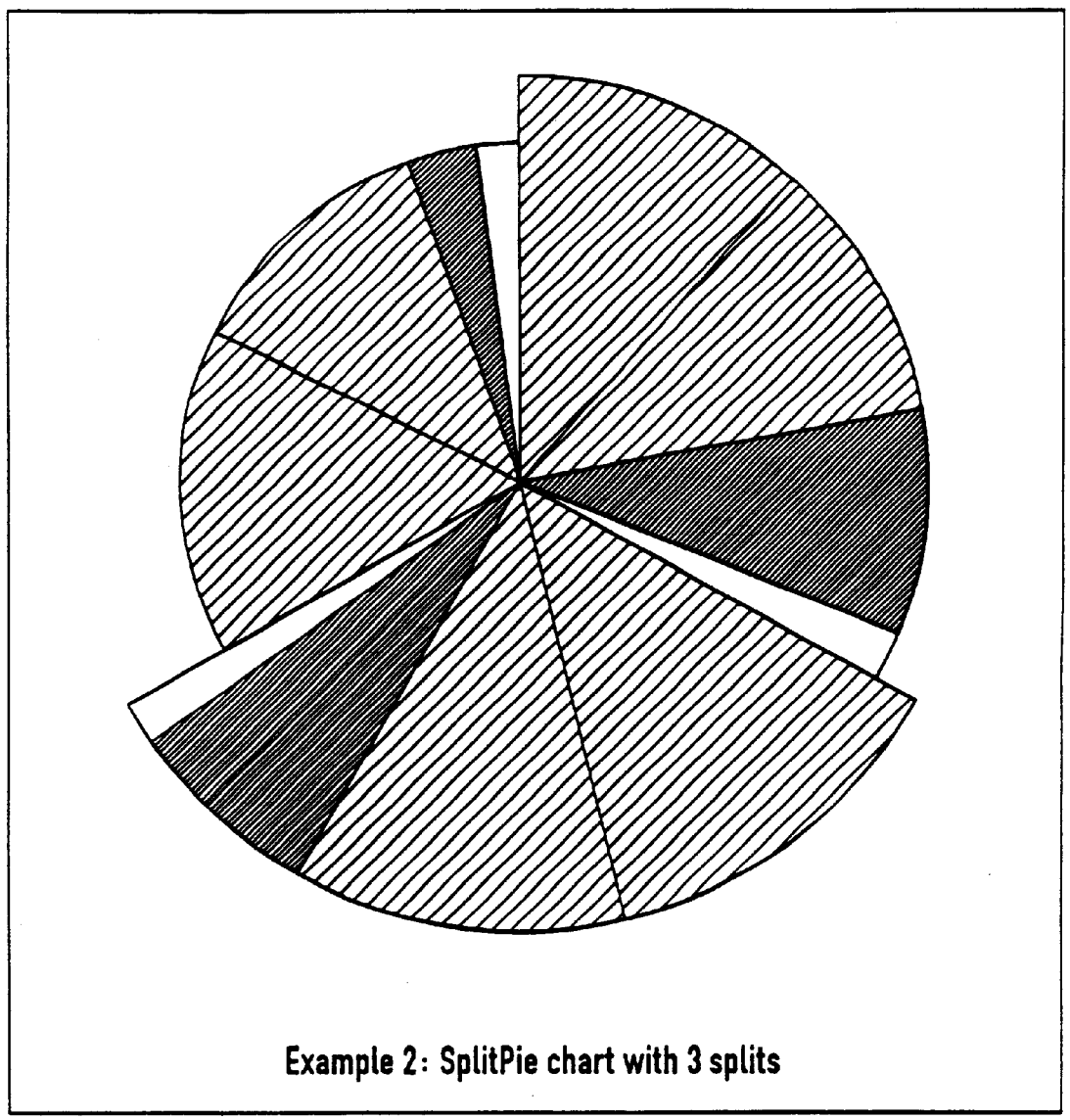
FIG. 11 is an example of a pie chart split three ways.

The present invention is not limited to comparisons of two sets of data points. Similarly, it is possible to compare the sales from multiple different time periods with no limitation on the number of periods. FIG. 9 is a sample table giving an example with three sets of sales figures. The same process described above is applied to scenarios where the user would like to compare multiple sets of data points. FIG. 10 is a flowchart depicting the additional calculation which occurs. First, the data is input 1002 into the visual display system. The system then calculates 1004 the total number of data sets. The pie chart is then split fractionally 1006 into the same number of splits with the same size in degrees of the circle. FIG. 11 is an example of pie chart split three ways. Alternatively, the radial size of the splits can also reflect a comparison. The system can calculate 1008 the relative size of the total size from each year and adjust 1010 the sizes of the splits. The pie chart is then divided 1012 into a number of splits reflecting the number of data sets. Finally, the radial size of the splits can also reflect the relative values of the data set totals. The radial fractions are calculated 1014 from the relative sizes of the totals from the different data sets. The size of the split are adjusted 1016, and the pie chart is divided 1012 proportionate fractional radial portions.

Figure 12:
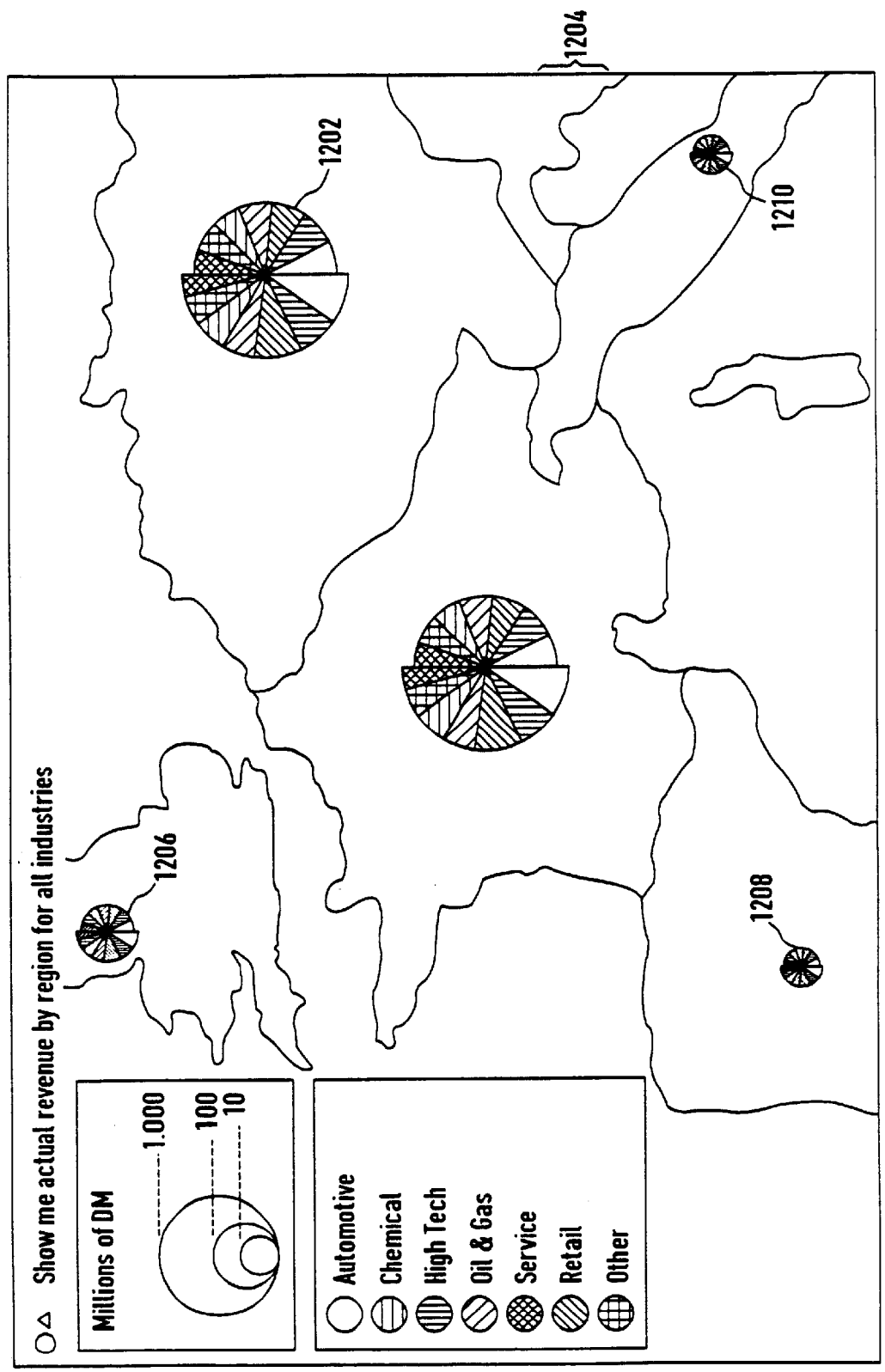
FIG. 12 depicts a pie chart of the present invention with the geographic variable feature included.
Figure 13:
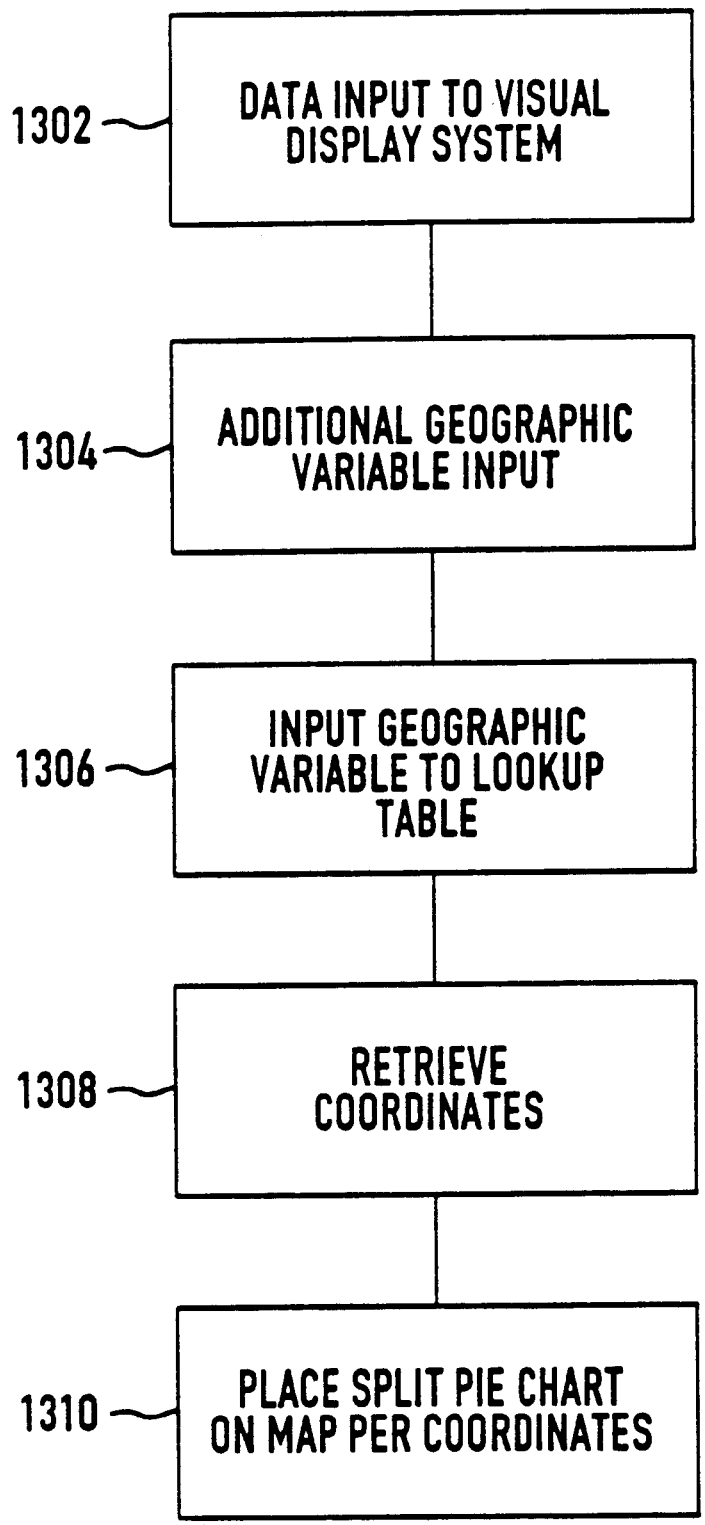
FIG. 13 depicts a flowchart of the process of generating a pie chart of with the inclusive geographic variable.

Furthermore, as depicted in FIG. 12, the present invention may also place pie chart 1202 on a computer generated map 1204 such that the data corresponds to the location of the pie chart on the map, based on the previous example. The user may request a plurality of comparisons 1206, 1208, 1210 simultaneously for different geographic areas. FIG. 13 depicts a flowchart of the process of generating a pie chart with the inclusive geographic variable. When the data is input 1302 into the visual display system, an additional geographic variable of place is also inputted. The system then converts 1304 the physical place into corresponding coordinates on the map by means of a lookup table 1306, retrieves the coordinates 1308, and places 1310 the split pie chart appropriately. The present invention will then simultaneously generates multiple split pie charts placed on the computer generated map. In addition, the invention can plot the multiple split pie charts to show relativity between the pie charts themselves. As aforementioned, one can compare the relativity of the two sides of the pie chart based on their sizes. When there are multiple split pie charts in various geographic areas, the total value of the pie charts can be visually compared by the relative sizes of the entire charts in comparison to each other. As can be seen from FIG. 12, pie charts 1206, 1208, 1210, are of different total areas. These areas reflect the total value of the sales of each of these regions, as well as the relative value of sales within each region from year to year.

Figure 14:
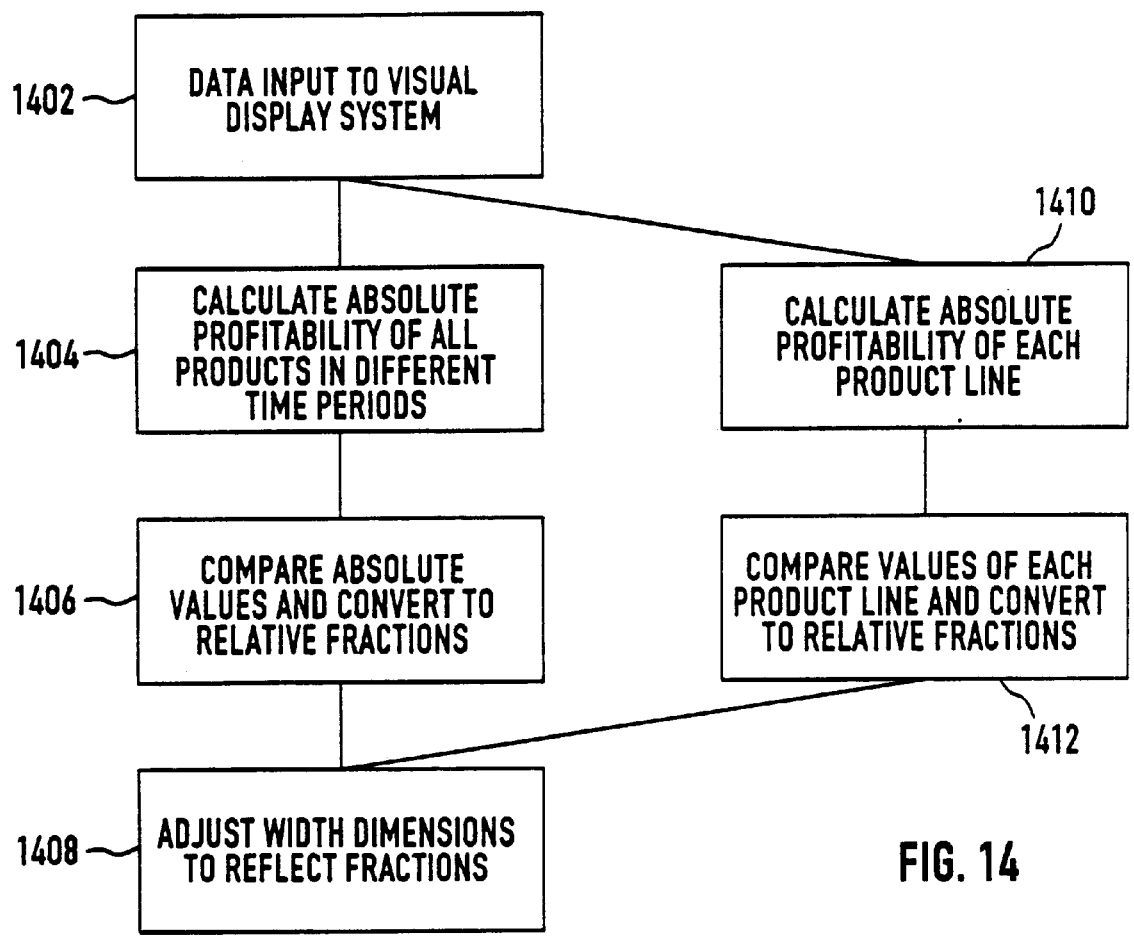
FIG. 14 is a flowchart depicting the additional calculation performed to generate a split pie chart with the third dimension of width.
Figure 15:
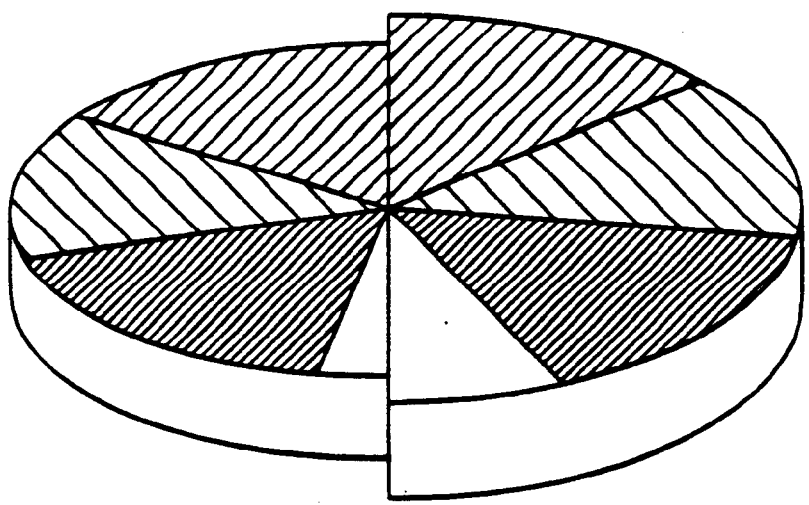
FIG. 15 depicts the split pie chart with a third dimension.
Figure 16:
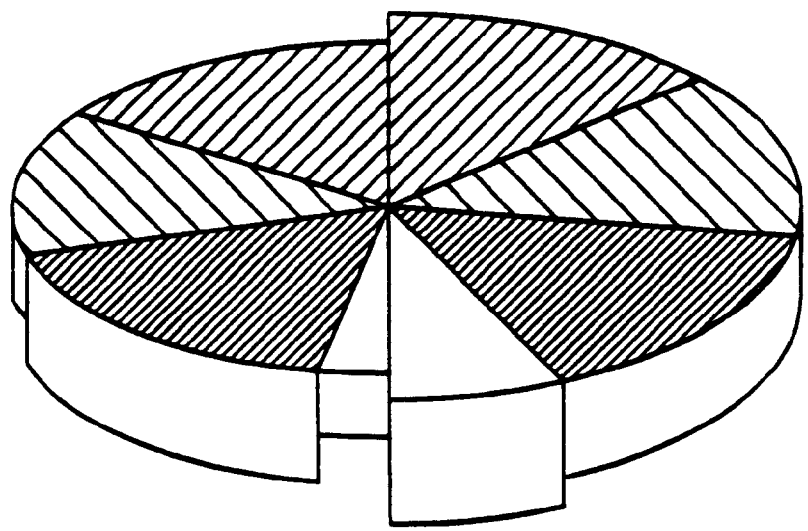
FIG. 16 depicts a split pie chart where each wedge has its own width.

In another embodiment, the interactive split pie chart can be given a width, the value of which can correspond to another variable. For example, if a user wanted to compare profitability between the different years, the width variable could be assigned to signify this value. As profitability is not a function of total revenues, the width variable allows the user to get a more accurate sense of the financial performance of the company which for sales are depicted in the table of FIG. 6. FIG. 14 is a flowchart depicting the additional calculation performed to generate this embodiment of the split pie chart. First, the data is input 1402 to the visual display system. As per the stated example, the system would calculate 1404 the absolute profitability of each year based on that year's revenues and overhead. The system would then compare 1406 the absolute profitability values from the two time periods and calculate them as fractions of each other. The width dimension of each split would then be adjusted 1408 to reflect the values of these fractions. Therefore, each half of the pie chart can be given its own width to provide another element of comparison. In addition, the profitability of each wedge itself can be calculated 1410. In the previous example, the profitability of each wedge can be calculated as a percentage value. The multiple profitability values can then be calculated 1412 as fractions of each other in order create wedges of different widths. Each wedge is plotted with a width which reflects its relative profitability compared to other product lines, as well as compared to other years. FIG. 15 depicts the split pie chart described above with the added width dimension. FIG. 16 depicts the split pie chart described above where each wedge has its own width dimension.

Figure 17:
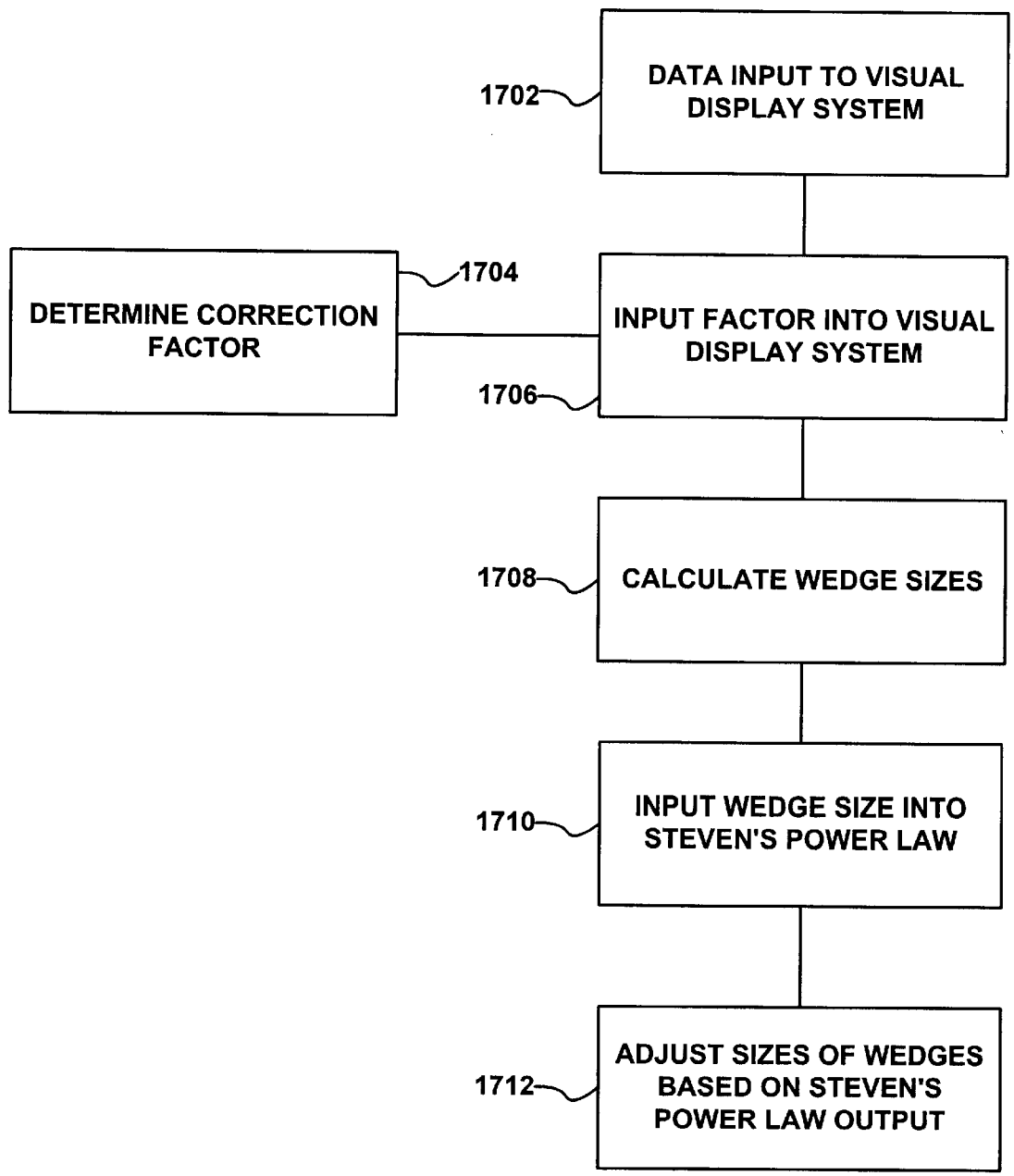
FIG. 17 depicts a flowchart showing the generation of a split pie chart taking into account Stevens' law.

In yet another embodiment, the interactive split pie chart can be comprised of wedges whose size is adjusted for Stevens' law. Stevens' law embodies the general relation between physical amount and perceived amount which is not necessarily one to one in a graphic image of a circle. The relation is characterized as a power function: perceived amount=a(physical amount)$^b$. When the exponent b=1.0, the increase in perceived amount corresponds directly to the increase in the physical amount. However, the physical dimensions of the area of a circle typically produce exponents in Stevens' law of less than 1.0. The present invention also provides a means for correcting for this factor. FIG. 17 depicts a flowchart showing the generation of a split pie chart taking into account Stevens' law. The data is input 1702 to the visual display system. The programmer determines 1704 what particular correction factor to use. This factor is then inputted 1706 into the visual display system. The steps of the generation of the pie chart are the same as detailed above except with regard to one step. The wedge sizes are calculated 1708, and then the sizes are input 1710 into the Stevens' power law to yield the corrected values of the wedge sizes. Before plotting the pie chart itself, the sizes of the splits are adjusted 1712 according to the formula of Stevens' law contingent on the correction factor b which the programmer inputs. Furthermore, the relative sizes of the wedges can also be increased or decreased inclusive of this factor in order to accurately convey the perceived amount to the user. Finally, when placing multiple split pie charts on a map, the total area of the pie charts themselves can be adjusted for Stevens' law.

Figure 19:
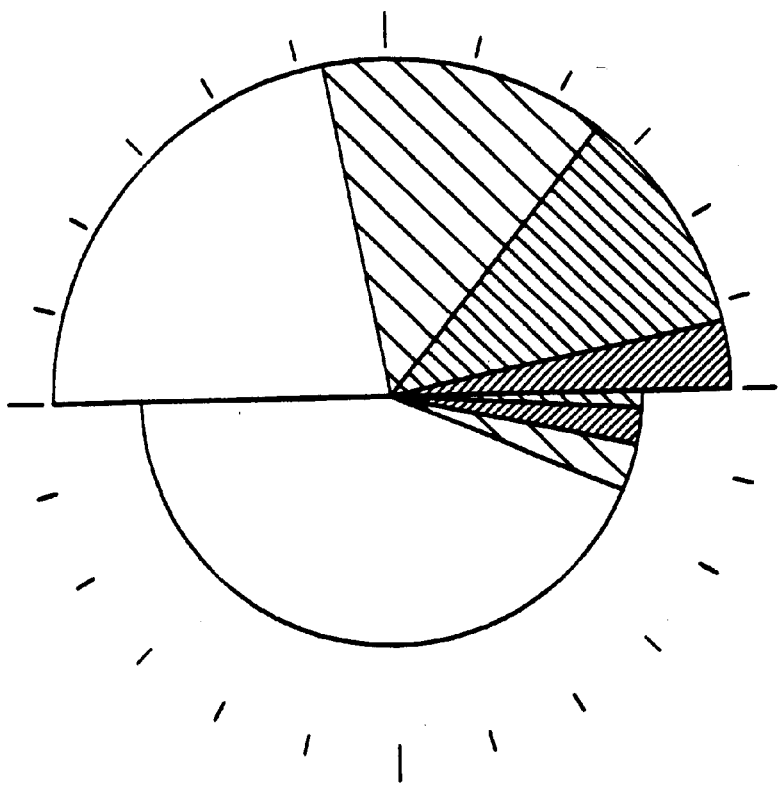
FIG. 19 depicts the present invention with the tick marks placed around the circumference of the larger split in a circle.
Figure 18:
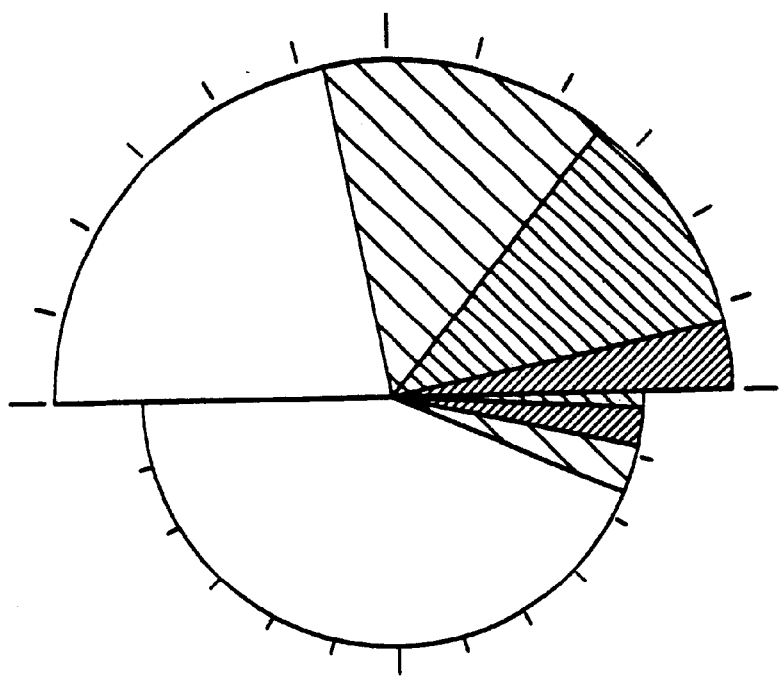
FIG. 18 depicts the present invention with tick marks placed around the circumference of the split pie chart.

In another embodiment, tick marks can be placed around the circumference of the split pie chart as a visual aid for determining precise quantities. The variables for generating the tick marks are described in FIG. 5, and FIG. 18 depicts the present invention with the tick marks placed right on the circumference of the split pie chart. FIG. 19 depicts the present invention with the tick marks placed around the circumference of the larger split in a true circle.

We claim:

1. A system for comparing a first set of data having two or more data, and a second set of data having two or more data in a split pie chart comprising:

means for splitting a pie chart into a first half and a second half to generate said split pie chart, said splitting creating an angle of 180 degrees between said first half and said second half;

means for generating a first plurality of wedges with a first plurality of sizes for said first set of data in said first half of said split pie chart, wherein the size of each wedge in said first plurality of wedges corresponds to a data in said first set of data;

means for generating a second plurality of wedges with a second plurality of sizes for said second set of data in said second half of said split pie chart, wherein the size of each wedge in said second plurality of wedges corresponds to a data in said second set of data;

means for measuring the relative sizes of said first set of data and said second set of data; and means for altering the area of said first half or the area of said second half of said split pie chart based on said measuring.

2. The system of claim 1 further comprising:

means for storing data in a data storage mechanism;

means for making a first request for said first set of data through a user interface;

means for communicating said first request for said first set of data from said user interface to said data storage mechanism;

means for retrieving said first set of data from said data storage mechanism;

means for communicating said first set of data to said user interface;

means for making a second request for said second set of data, which contains identical variables as said first set of data, through a user interface;

means for communicating said second request for said second set of data from said user interface to said data storage mechanism;

means for retrieving said second set of data from said data storage mechanism; and means for communicating said second set of data to said user interface.

3. The system of claim 1 further comprising:

means for requesting a geographic variable corresponding to said first set of data and said second set of data;

means for generating a computerized map based on said requesting of said geographic variable; and means for placing said split pie chart on said computerized map.

4. The system of claim 3 further comprising:

means for placing a plurality of said split pie charts on said computerized map.

5. The system of claim 4 further comprising:

means for calculating the relative sizes of said plurality of said split pie charts; and means for decreasing or increasing the sizes of said plurality of said split pie charts based upon said calculating.

6. The system of claim 1 further comprising:

means for making a plurality of requests for a plurality of sets of data;

means for splitting said split pie chart into a plurality of sections corresponding to said plurality of sets of data;

means for calculating the relative size of each set of data in comparison to the total size of all the sets of data; and means for increasing or decreasing the size of said sections based upon the calculated relative size of the corresponding set of data.

7. The system of claim 1 wherein said split pie chart has a circumference further comprising:

means for placing marks around said circumference of said split pie chart at predetermined intervals.

8. The system of claim 7 wherein said split pie chart has three dimensions.

9. The system of claim 8 further comprising:

means for altering a third dimension of said three dimensions of one of said first half or said second half of said split pie chart corresponding to the value of an additional variable.

10. The system of claim 1 further comprising:

means for providing a power law formula;

means for inputting a correction factor into said power law formula;

means for inputting said first plurality of sizes and said second plurality of sizes into said power law formula;

means for calculating corrected sizes from said first plurality and said second plurality of sizes; and means for adjusting said first plurality and said second plurality of sizes taking into account said corrected sizes.

11. The system of claim 1 further comprising:

means for providing a power law formula;

means for inputting a correction factor into said power law formula;

means for inputting said size of said first half and said size of said second half of said split pie chart into said power law formula;

means for calculating corrected split sizes from said size of said first half and said size of said second half; and means for adjusting said size of said first half and said size of said second half taking into account said corrected split sizes.

12. The system of claim 5 further comprising:
means for providing a power law formula;
means for inputting a correction factor into said power law formula;
means for inputting said relative sizes of said plurality of said split pie charts into said power law formula;
means for calculating corrected sizes from said relative sizes of said split pie charts; and
means for adjusting said relative sizes of said split pie charts taking into account said corrected sizes.

13. The system of claim 2 wherein said data storage mechanism is a spreadsheet.

14. The system of claim 2 wherein said data storage mechanism is a relational database.

15. The system of claim 2 wherein said data storage mechanism is a multidimensional database.

16. The system of claim 2 wherein said first plurality of sizes of said first plurality of wedges and said second plurality of sizes of said second plurality of wedges are numerically sorted by size.

17. A method for comparing a first set of data having two or more data, and a second set of data having two or more data in a split pie chart comprising the steps of:
splitting a pie chart into a first half and a second half to generate said split pie chart, said splitting creating an angle of 180 degrees between said first half and said second half;
generating a first plurality of wedges with a first plurality of sizes for said first set of data in said first half of said split pie chart, wherein the size of each wedge in said first plurality of wedges corresponds to a data in said first set of data;
generating a second plurality of wedges with a second plurality of sizes for said second set of data in said second half of said split pie chart, wherein the size of each wedge in said second plurality of wedges corresponds to a data in said second set of data;
measuring the relative sizes of said first set of data and said second set of data; and
altering the area of said first half or the area of said second half of said split pie chart based on said measuring.

18. The system of claim 17 further comprising the steps of:
storing data in a data storage mechanism;
making a first request for said first set of data through a user interface;
communicating said first request for said first set of data from said user interface to said data storage mechanism;
retrieving said first set of data from said data storage mechanism;
communicating said first set of data to said user interface;
making a second request for said second set of data, which contains identical variables as said first set of data, through a user interface;
communicating said second request for said second set of data from said user interface to said data storage mechanism;
retrieving said second set of data from said data storage mechanism; and
communicating said second set of data to said user interface.

19. The method of claim 17 further comprising the steps of:
requesting a geographic variable corresponding to said first set of data and said second set of data;
generating a computerized map based on said requesting of said geographic variable; and
placing said split pie chart on said computerized map.

20. The method of claim 19 further comprising the steps of:
placing a plurality of said split pie charts on said computerized map.

21. The method of claim 20 further comprising the steps of:
calculating the relative sizes of said plurality of said split pie charts; and
decreasing or increasing the sizes of said plurality of said split pie charts based upon said calculating.

22. The method of claim 17 further comprising the steps of:
making a plurality of requests for a plurality of sets of data;
splitting said split pie chart into a plurality of sections corresponding to said plurality of sets of data;
calculating the relatives size of each set of data in comparison to the total size of all the sets of data; and
increasing or decreasing the size of said sections based upon the calculated relative size of the corresponding set of data.

23. The method of claim 17 wherein said split pie chart has a circumference further comprising the step of:
placing marks around said circumference of said pie chart at predetermined intervals.

24. The method of claim 23 further comprising the step of providing a third dimension of three dimensions to said split pie chart.

25. The method of claim 24 further comprising the step of:
altering said third dimension of three dimensions of one of said first half and said second half of said split pie chart corresponding to the value of an additional variable.

26. The method of claim 17 further comprising the steps of:
providing a power law formula;
inputting a correction factor into said power law formula;
inputting said first plurality of sizes and said second plurality of sizes into said power law formula;
calculating corrected sizes from said first plurality and said second plurality of sizes; and
adjusting said first plurality and second plurality of sizes taking into account said corrected sizes.

27. The method of claim 17 further comprising the steps of:
providing a power law formula;
inputting a correction factor into said power law formula;
inputting said size of said first half and said size of said second half of said split pie chart into said power law formula;
calculating corrected split sizes from said size of said first half and said size of said second half; and
adjusting said size of said first half and said size of said second half taking into account said corrected split sizes.

28. The method of claim 21 further comprising the steps of:
providing a power law formula;

inputting a correction factor into said power law formula;

inputting said relative sizes of said plurality of said split pie charts into said power law formula;

calculating corrected sizes from said relative sizes of said split pie charts; and adjusting said relative sizes of said split pie charts taking into account said corrected sizes.

29. The method of claim 18 wherein said data storage mechanism is a spreadsheet.

30. The method of claim 18 wherein said data storage mechanism is a relational database.

31. The method of claim 18 wherein said data storage mechanism is a multidimensional database.

32. The method of claim 18 further comprising the step of numerically sorting said first plurality of sizes of said first plurality of wedges and said second plurality of sizes of said second plurality of wedges by size.

33. A computer-readable medium having stored thereon a plurality of instructions, said plurality of instructions including instructions which, when executed by a processor, cause the processor to display a first set of data having two or more data, and a second set of data having two or more data by performing the steps of:

splitting a pie chart into a first half and a second half to generate said split pie chart, said splitting creating an angle of 180 degrees between said first half and said second half;

generating a first plurality of wedges for said first set of data in said first half of said split pie chart, wherein the size of each wedge in said first plurality of wedges corresponds to a data in said first set of data;

generating a second plurality of wedges for said second set of data in said second half of said split pie chart, wherein the size of each wedge in said second plurality of wedges corresponds to a data in said second set of data;

measuring the relative size of said first set of data and said second set of data; and altering the area of said first half or the area of said second half of said split pie chart based on said measuring.

34. The computer-readable medium of claim 33 wherein said instructions, when executed by a processor, cause the processor to perform the further steps of:

storing data in a data storage mechanism;

making a first request for said first set of data through a user interface;

communicating said first request for said first set of data from said user interface to said data storage mechanism;

retrieving said first set of data from said data storage mechanism;

communicating said first set of data to said user interface;

making a second request for said second set of data, which contains identical variables as said first set of data, through a user interface;

communicating said second request for said second set of data from said user interface to said data storage mechanism;

retrieving said second set of data from said data storage mechanism; and communicating said second set of data to said user interface.

35. The computer-readable medium of claim 33 wherein said instructions, when executed by said processor, cause the processor to perform the further steps of:

requesting a geographic variable corresponding to said first set of data and said second set of data;

generating a computerized map based on said requesting of said geographic variable; and placing said split pie chart on said computerized map.

36. The computer-readable medium of claim 35 wherein said instructions, when executed by said processor, cause the processor to perform the further step of:

placing a plurality of said split pie charts on said computerized map.

37. The computer-readable medium of claim 36 wherein said instructions, when executed by said processor, cause the processor to perform the further steps of:

calculating the relative sizes of said plurality of said split pie charts; and decreasing or increasing the sizes of said plurality of said split pie charts based upon said calculating.

38. The computer-readable medium of claim 33 wherein said instructions, when executed by a processor, cause the processor to perform the further steps of:

making a plurality of requests for a plurality of sets of data;

splitting said split pie chart into a plurality of sections corresponding to said plurality of sets of data;

calculating the relatives size of each set of data in comparison to the total size of all the sets of data; and increasing or decreasing the size of said sections based upon the calculated relative size of the corresponding set of data.

39. The computer-readable medium of claim 33 wherein said instructions, when executed by said processor, cause the processor to perform the further step of:

placing marks around said circumference of said split pie chart at predetermined intervals.

40. The computer-readable medium of claim 39 wherein said instructions, when executed by said processor, cause the processor to perform the further step of providing a third dimension of three dimensions to said split pie chart.

41. The computer-readable medium of claim 40 wherein said instructions, when executed by said processor, cause the processor to perform the further step of:

altering said third dimension of three dimensions of one of said first half and said second half of said pie chart corresponding to the value of an additional variable.

42. The computer-readable medium of claim 33 wherein said instructions, when executed by said processor, cause the processor to perform the further steps of:

providing a power law formula;

inputting a correction factor into said power law formula;

inputting said first plurality of sizes and said second plurality of sizes into said power law formula;

calculating corrected sizes from said first plurality and said second plurality of sizes; and adjusting said first plurality and second plurality of sizes taking into account said corrected sizes.

43. The computer-readable medium of claim 33 wherein said instructions, when executed by a processor, cause the processor to perform the further steps of:

providing a power law formula;

inputting a correction factor into said power law formula;

inputting said size of said first half and said size of said second half of said split pie chart into said power law formula;

calculating corrected split sizes from said size of said first half and said size of said second half; and adjusting said size of said first half and said size of said second half taking into account said corrected split sizes.

44. The computer-readable medium of claim 36 wherein said instructions, when executed by said processor, cause the processor to perform the further steps of:
providing a power law formula;
inputting a correction factor into said power law formula;
inputting said relative sizes of said plurality of said split pie charts into said power law formula;
calculating corrected sizes from said relative sizes of said split pie charts; and
adjusting said relative sizes of said split pie charts taking into account said corrected sizes.

45. The computer-readable medium of claim 34 wherein said data storage mechanism is a spreadsheet.

46. The computer-readable medium of claim 34 wherein said data storage mechanism is a relational database.

47. The computer-readable medium of claim 34 wherein said data storage mechanism is a multidimensional database.

48. The computer-readable medium of claim 36 wherein said instructions, when executed by said processor, cause the processor to perform the further step of numerically sorting said first plurality of sizes of said first plurality of wedges and said second plurality of sizes of said second plurality of wedges by size.

49. A system for displaying data to a user in a split pie chart said system comprising:
a user interface configured to receive from the user a selection sufficient to identify a first set of data having two or more data and a second set of data having two or more data stored in a database;
a query subsystem for formulating a database query for said database based on said selection;
an interface for communicating said database query to a data storage mechanism associated with said database;
an interface for retrieving said first and said second sets of data to a visual display system; and
said visual display system generating and displaying said split pie chart such that said split pie chart has a first plurality of wedges for said first set of data on a first 180 degree side of said split pie chart, wherein the size of each wedge in said first plurality of wedges corresponds to a data in said first set of data, and a second plurality of wedges for said second set of data on a second 180 degree side of said split pie chart, wherein the size of each wedge in said second plurality of wedges corresponds to a data in said second set of data, said pluralities of wedges each having a respective total area derived dependent on a total of values of the associated set of data.

50. A system for obtaining and displaying data to a user, said system comprising:
a user interface adapted to receive input from said user and to derive from said input a selection identifying data stored by a database storage system;
a query subsystem communicating with said database storage system, said query subsystem preparing at least one query from the selection and transmitting said query to the database storage system;
a display system including a display device generating an image that can be seen by said user, said display device receiving a plurality of sets of data responsive to said query, each of said sets of data comprising a plurality of numerical data values, the number of said sets being at least three;

said display system preparing a split pie chart from the plurality of sets of data, said split pie chart including a split for each of the sets of data, said splits all having an equal split angle determined by dividing a circle by the number of sets of data in said plurality of sets of data, the split angle of said splits being 120° or less;
said splits each having a respective area derived based on a total of the numerical data values of the associated set of data;
said splits each being further divided into wedges, each representing an angular proportion of a respective numerical data value of the associated set of data; and
said display device displaying said split pie chart to said user.

51. The system of claim 50 wherein said area of each split is calculated so that said splits each have a respective radius that is greater or equal to a predetermined minimum radius, and less than or equal to a predetermined maximum radius.

52. The system of claim 50 wherein each split is formed of pixels, and the area of each split is determined using a variable representing a value per pixel.

53. The system of claim 50 wherein said area of each split of said pie chart is derived from the total of the numerical data values of the associated set of data and an adjustment such that said area of each split appears to human perception to be in a same proportion as the respective totals of each of the data sets of the plurality of data sets.

54. The system of claim 53 wherein said adjustment includes a correction according to the formula $$p=a^b$$

wherein p is a perceived area of said split, a is said total of said numerical data values of said associated set of data, and b is a preselected value.

55. The system of claim 50, wherein said split pie chart includes a first split pie chart, and further comprising:
a second split pie chart, said second split pie chart prepared based on a second input from said user;
and wherein said display device displaying said split pie chart to said user comprises:
said display device displaying said first and second pie charts having relative sizes that appear to human perception to be in the same proportion as said respective total values of the numerical values of the sets of data of the first and second pie charts.

56. The system of claim 50, wherein said splits each have a respective thickness, said thicknesses each being proportional to a respective additional data value associated with each respective set of data.

57. The system of claim 50, wherein said split pie chart is displayed in combination with a geographical map of a location listed in said database with at least one of the sets of data.

58. The system of claim 50, wherein said database is a relational database.

59. The system of claim 50, wherein said display system is interactive with said user and affords to said user a capability of selecting a parameter on which said split pie chart is generated and displayed.

60. The system of claim 59, wherein said parameter is a coefficient used in adjusting relative sizes of said splits to compensate for human perception of relative areas thereof.

61. A method of obtaining and displaying data to a user, said method comprising:
deriving from an input from said user a selection identifying data in a database;

querying said database using a query derived from said selection;

receiving from said database a plurality of sets of data responsive to said querying, said sets of data each comprising a plurality of numerical data values;

preparing a split pie chart for said user from said plurality of sets of data, wherein each set of data is associated respectively with a split, said preparing of said split pie chart including:

deriving a split angle for said splits of said sets of data, said split angles of said splits all being equal and being derived by dividing a circle by the number of data sets in said plurality of data sets, the number of data sets being three or more, and the split angle of the splits being 120° or less;

deriving areas of said splits, each area being determined dependent on a total of said numerical data values for said set of data associated therewith; and displaying said split pie chart to said user.

62. The method of claim 61, wherein the step of deriving areas further includes deriving areas so that said splits each have a respective radius that is greater than or equal to a predetermined minimum radius and less than or equal to a predetermined maximum radius.

63. The method of claim 61, wherein said splits are each formed of pixels, with said area of each split being determined using a variable representing a value per pixel.

64. The method of claim 61, wherein said area of each split of said pie chart is derived from the total of said associated numerical data values and an adjustment such that each split has an area that appears to a human perception to be in a same proportion as said totals of said numerical data values.

65. The method of claim 64 wherein said adjustment includes a correction according to the formula $$p=a^b$$

wherein p is a perceived area of said split, a is said total of said numerical data values of said associated set of data, and b is a preselected value.

66. The method of claim 61, wherein said split pie chart includes a first split pie chart, and further comprising:

a second split pie chart, said second split pie chart prepared based on a second input from said user;

and wherein displaying said split pie chart to said user includes displaying said first and second split pie charts such that said first and second pie charts have relative sizes that appear to human perception to be in a same proportion as said total values of said numerical values of said respective sets of data of said first and second pie charts.

67. The method of claim 61, wherein each split has a respective thickness proportional to a respective additional data value associated with each respective set of data.

68. The method of claim 61, further comprising:

obtaining a computer-stored map of a geographical location linked in said data base with at least one of said sets of data; and displaying said split pie chart to said user superimposed on said map.

69. The method of claim 61, wherein said database is a relational database.

70. The method of claim 61, further comprising:

receiving a parameter input from said user selecting a parameter with which said split pie chart is generated;

displaying said split pie chart generated by said selected parameter.

71. The method of claim 70, wherein said parameter is a coefficient used in adjusting relative sizes of said splits to compensate for human perception of relative areas thereof.

72. A computer readable medium having stored thereon a plurality of instructions which, when executed by a processor, cause the processor to perform the steps of the method of claim 61.

73. A computer readable medium having stored thereon a plurality of instructions which, when executed by a processor, cause the processor to perform the steps of the method of claim 62.

74. A computer readable medium having stored thereon a plurality of instructions which, when executed by a processor, cause the processor to perform the steps of the method of claim 63.

75. A computer readable medium having stored thereon a plurality of instructions which, when executed by a processor, cause the processor to perform the steps of the method of claim 64.

76. A computer readable medium having stored thereon a plurality of instructions which, when executed by a processor, cause the processor to perform the steps of the method of claim 65.

77. A computer readable medium having stored thereon a plurality of instructions which, when executed by a processor, cause the processor to perform the steps of the method of claim 66.

78. A computer readable medium having stored thereon a plurality of instructions which, when executed by a processor, cause the processor to perform the steps of the method of claim 67.

79. A computer readable medium having stored thereon a plurality of instructions which, when executed by a processor, cause the processor to perform the steps of the method of claim 68.

80. A computer readable medium having stored thereon a plurality of instructions which, when executed by a processor, cause the processor to perform the steps of the method of claim 69.

81. A computer readable medium having stored thereon a plurality of instructions which, when executed by a processor, cause the processor to perform the steps of the method of claim 70.

82. A computer readable medium having stored thereon a plurality of instructions which, when executed by a processor, cause the processor to perform the steps of the method of claim 71.

* * * * *